(No Model.)
C. J. WILSON.
SAW TOOTH.
No. 337,103. Patented Mar. 2, 1886.
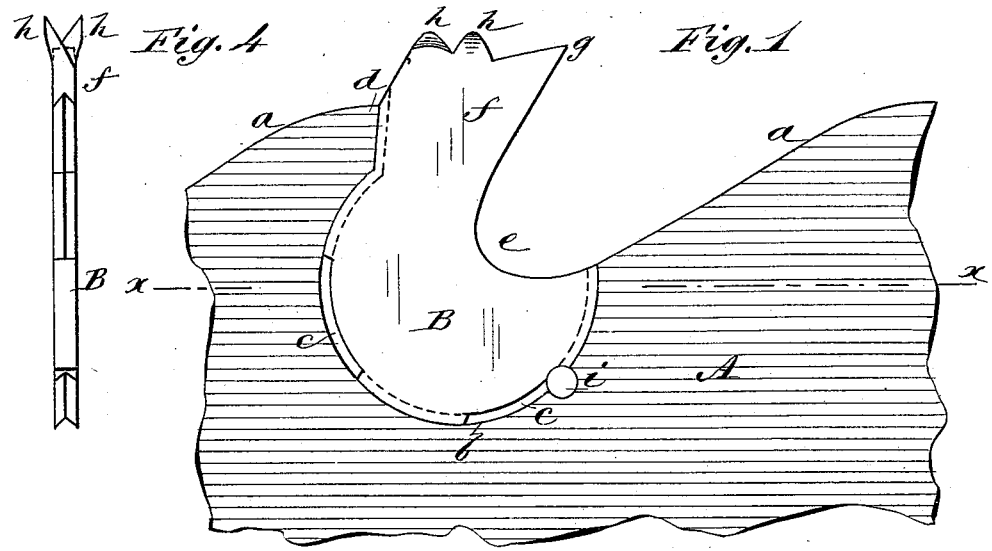
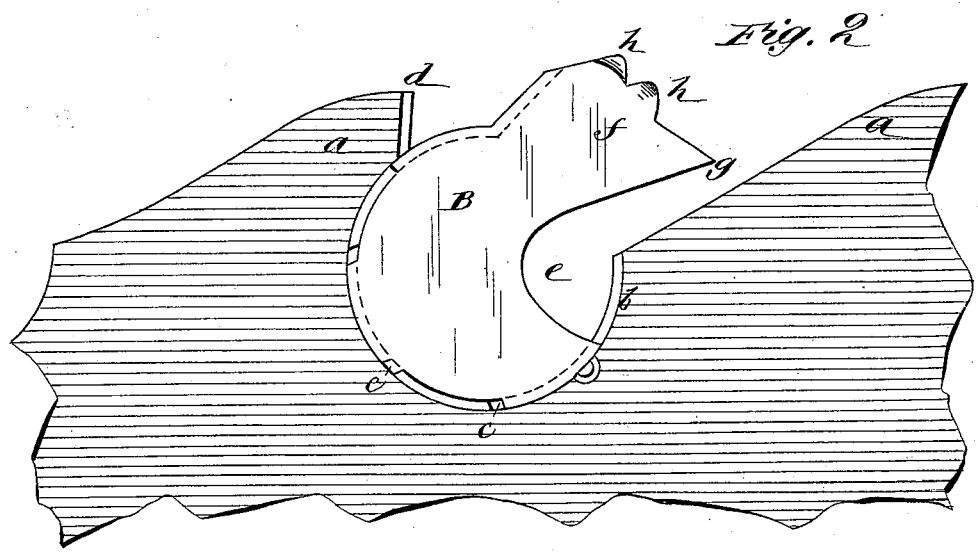
WITNESSES:
C. Neveux
C. Sedgwick
INVENTOR:
C. J. Wilson
BY Munn & Co
ATTORNEYS.

UNITED STATES PATENT OFFICE.

CHRISTOPHER J. WILSON, OF KNOXVILLE, TENNESSEE.

SAW-TOOTH.

SPECIFICATION forming part of Letters Patent No. 337,103, dated March 2, 1886.

Application filed December 5, 1885. Serial No. 184,813. (No model.)

*To all whom it may concern:*

Be it known that I, CHRISTOPHER JENKINS WILSON, of Knoxville, in the county of Knox and State of Tennessee, have invented a new and useful Improvement in Saws, of which the following is a specification, reference being had to the annexed drawings, forming a part thereof, in which—

Figure 1 is a side elevation of a portion of a saw to which my improvement has been applied. Fig. 2 is a side elevation of a saw with a tooth about to be inserted in its place. Fig. 3 is a transverse section taken on line $x$ $x$ in Fig. 1. Fig. 4 is an edge view of a removable tooth.

Similar letters of reference indicate corresponding parts in the different figures of the drawings.

My invention consists in the construction and arrangement of parts, as will be hereinafter fully described and claimed.

The saw-plate A is of the usual description, having a part, $a$, of each tooth formed thereon, and having at the base of each tooth a circular notch, $b$. The edge of the saw-plate around the periphery of the circular notch $b$ is made V-shaped, and is cut away at intervals, as indicated at $c$ in Fig. 1. The V-shaped form of the edge of the saw-plate extends outward along the straight part $d$ of the tooth $a$.

The removable tooth B consists of a circular plate in which is formed a notch, $e$, at one side of which projects the cutter $f$, having the saw-tooth point $g$ and the smooth-cutting knife-edges $h$, which are formed on opposite sides of the cutter $f$, and are bent outward slightly away from each other to bring them into engagement with the wood being sawed. These knives $h$ $h$ project outward from the cutter $f$ beyond the point $g$, so that the said knives $h$ will cut deeper into the wood than the point $g$, and the point $g$ of every tooth will remove or clear the material cut by the knives $h$ on the tooth in front of it—that is to say, each succeeding point $g$ will remove the material between the two cuts formed by the preceding knives $h$ $h$. The periphery of the circular part of the tooth B and the back of the cutter $f$ are provided with a V-shaped groove, which is adapted to receive the V-shaped tongue formed around the edges of the circular notch in the saw-plate, and portions of the edge of the tooth B are cut away to admit of placing the tooth in the circular notch of the saw-plate before bringing the tongue of the saw-plate into engagement with the groove of the tooth, as shown in Fig. 2. When the tooth is in this position, the portions of the tongue remaining on the edge of the saw-plate around the notch will alternate with the portions of the groove remaining on the edges of the tooth, and by turning the tooth backward the tongue of the edge of the saw-plate will slide into the groove of the edge of the tooth and will retain the tooth in its position in the saw.

The backward movement of the cutter $f$ is limited by that part of the tooth which is formed integrally with the saw-plate.

When the tooth is in its place in the edge of the saw-plate, as shown in Fig. 1, the notch $e$ of the removable tooth conforms to the general outline of the saw-tooth $a$, as shown in Fig. 1. When it is desired to secure the removable saw-tooth permanently in its place, a rivet, screw, or eyelet, $i$, is inserted in a hole drilled through the removable tooth and through the saw-plate.

By means of my improvement I am enabled to remove the tooth from the saw-plate by turning it through a part only of a revolution and to readily replace it.

By providing the cutting-edges $h$ $h$, I am enabled to make a saw which will saw and plane at one operation.

Having thus described my invention, what I claim as new, and desire to secure by Letters Patent, is—

1. A saw-tooth, B, having a cutter, $f$, provided with the point $g$ at the forward end of its upper edge, and the knives $h$ $h$ on opposite sides of said edge in rear of the cutter, the said knives extending into a higher plane than the point $g$, substantially as set forth.

2. The combination of a saw-plate, A, having in the edge thereof circular notches, and a V-shaped tongue formed around the notches, and a tooth, B, having an interrupted groove around its edge adapted to receive the interrupted tongue of the saw-plate, and provided with the cutter $f$, having the saw-cutting point $g$ and the knives $h$ $h$ formed thereon, substantially as herein specified.

CHRISTOPHER J. WILSON.

Witnesses:
J. B. WILLIAMSON,
W. H. MITCHELL.